United States Patent
Wang et al.

(10) Patent No.: US 8,868,080 B2
(45) Date of Patent: Oct. 21, 2014

(54) HANDOVER IN CASE OF A RADIO LINK FAILURE

(75) Inventors: Min Wang, Luleå (SE); Konstantinos Dimou, Stockholm (SE); Magnus Stattin, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 84 days.

(21) Appl. No.: 13/641,286

(22) PCT Filed: Apr. 23, 2010

(86) PCT No.: PCT/SE2010/050449
§ 371 (c)(1),
(2), (4) Date: Oct. 15, 2012

(87) PCT Pub. No.: WO2011/133079
PCT Pub. Date: Oct. 27, 2011

(65) Prior Publication Data
US 2013/0035101 A1 Feb. 7, 2013

(51) Int. Cl.
*H04W 36/24* (2009.01)
*H04W 36/08* (2009.01)
*H04W 36/00* (2009.01)
*H04W 28/04* (2009.01)
*H04W 92/20* (2009.01)

(52) U.S. Cl.
CPC .......... *H04W 36/08* (2013.01); *H04W 36/0005* (2013.01); *H04W 28/04* (2013.01); *H04W 92/20* (2013.01)

USPC ............................ 455/437; 455/436; 370/331

(58) Field of Classification Search
USPC ........................... 455/436–455; 370/331–338
See application file for complete search history.

(56) References Cited

U.S. PATENT DOCUMENTS

2005/0026615 A1 2/2005 Kim
2008/0261600 A1 10/2008 Somasundaram et al.

FOREIGN PATENT DOCUMENTS

EP         1883263 A1    1/2008
WO    2007089128 A1    8/2007

OTHER PUBLICATIONS

3rd Generation Partnership Project. "Details of the Handover Procedure." 3GPP TSG-RAN WG2 Meeting #60, Tdoc R2-074922, Jeju Island, Korea, Nov. 5-9, 2007.

*Primary Examiner* — Kashif Siddiqui
(74) *Attorney, Agent, or Firm* — Murphy, Bilak & Homiller, PLLC

(57) ABSTRACT

The present invention relates to methods and arrangements in a UE and a RBS in a wireless communications system, enabling an efficient handover of the user equipment. The method comprises transmitting (810) a message to the serving radio base station, the message indicating the need for a handover to a cell of a target radio base station. It also comprises observing (820) an indication that a handover request transmitted by the serving radio base station is rejected by the target radio base station, and selecting (830) a recovery cell based on the observed indication when detecting a radio link failure.

18 Claims, 13 Drawing Sheets

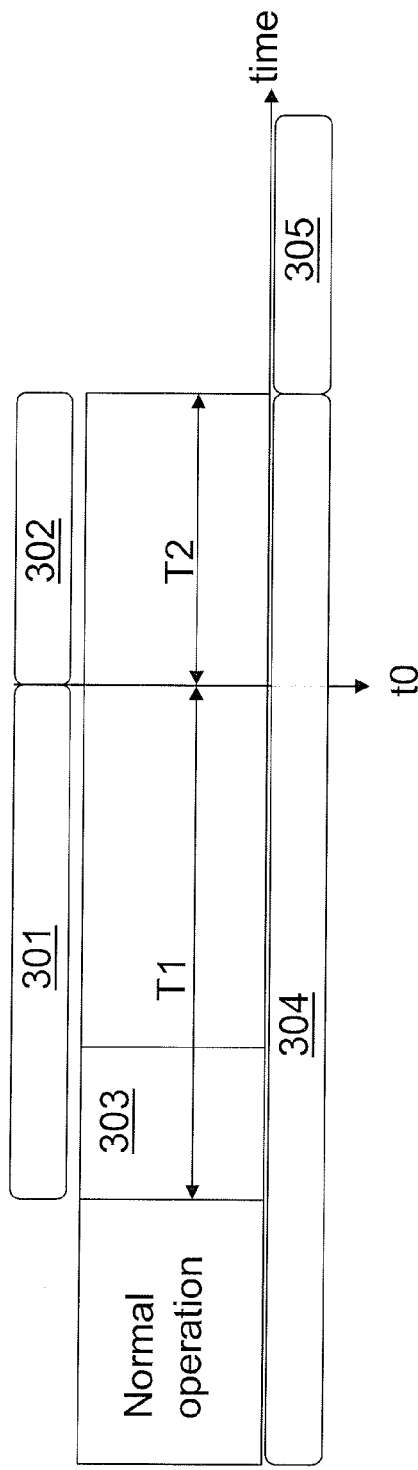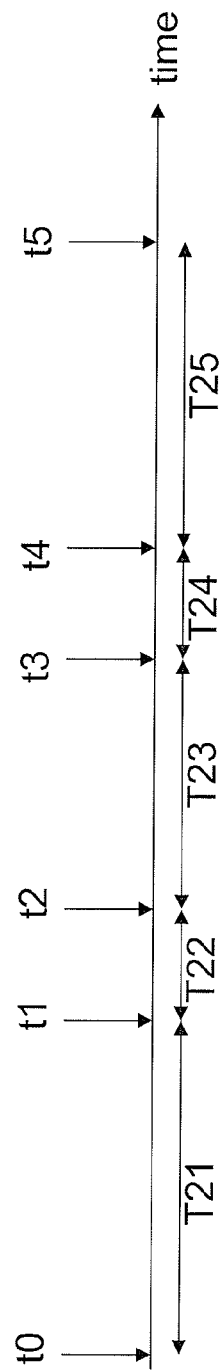
Fig. 3a
Fig. 3b

HANDOVER IN CASE OF A RADIO LINK FAILURE

TECHNICAL FIELD

The present invention relates to methods and arrangements in a user equipment and a radio base station of a wireless communication system. In particular it relates to improving handover of the user equipment.

BACKGROUND

The Universal Mobile Telecommunication System (UMTS) is one of the third generation mobile communication technologies designed to succeed GSM. 3GPP Long Term Evolution (LTE) is a project within the 3$^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and evolved UTRAN (e-UTRAN) is the radio access network of an LTE system. As illustrated in FIG. 1, an e-UTRAN typically comprises user equipments (UE) 150 wirelessly connected to radio base stations (RBS) 110a-c, commonly referred to as eNodeB (eNB). The eNBs serve one or more areas referred to as cells 120a-c and may communicate with each other over the X2 interface. In FIG. 1a the UE 150 is served by the cell 120a of the serving eNB 110a. Cells 120b and 120c are neighboring cells.

One of the 3GPP LTE features with higher performance requirements is the handover (HO). The HO performance is of key importance in an LTE system, since the requirements of mobility performance are stringent, namely mobility should be maintained with good performance at speeds of up to 350 km/h. In addition, LTE is designed to guarantee lower latency for both the control plane and the user plane compared to the previous systems, e.g. UMTS, with the use of a dedicated preamble in the random access procedure. Hence, in the case of HO, when interruption in the data and control plane occur, LTE can achieve 12-22 ms user plane interruption in both uplink and downlink in normal cases. In this respect, it is important to devise mechanisms which maintain the good HO performance in terms of interruption time even in challenging scenarios.

The HO procedure may be described as a group of consecutive HO Radio Resource Control (RRC) signaling messages between a UE and a serving or source eNB. Several X2 messages for the signaling between the source and target eNB are also needed when the source and target cells are in different eNBs. The HO procedure is schematically illustrated in FIG. 2. The procedure is started when a UE transmits a measurement report message 201 to the source eNB, where the measurement report indicates that a HO is needed. The measurement report thus triggers the HO procedure, and is based on downlink radio channel quality measurements in serving and neighboring cells. The measurement report is transmitted if the radio quality of the serving cell is typically a number of dB lower than that of a neighboring or target cell (corresponding to the so called HO Hysteresis Trigger) for a defined period (corresponding to the so called HO Time-to-Trigger). The UE reports a "best cell" list including all the neighboring cells which has higher radio channel quality than the serving cell. The source eNB makes a HO decision 202 based on the "best cell" list in the measurement report, and sends a HO request 203 via the X2 interface to the eNB that is determined to be the target. Such a HO request 203 is only admitted if the cell of the target eNB has available resources. If there are available resources, the target eNB reserves the resources 204, and sends back a HO request acknowledgement 205 to the source eNB. When the source eNB receives the acknowledgement 205, it sends a HO command 206 to the UE, which will then switch 207 to the target cell. From a UE perspective, the HO procedure ends when the UE has accessed the target cell successfully through the random access procedure 208 and therefore transmits a HO complete message 209 to the target eNB. The target eNB will also ask the source eNB to release the UE resources 210.

Radio link failure (RLF) may be detected if the radio channel quality is bad. Within 3GPP LTE, this occurs upon detection of N out-of-sync indications from the physical layer, or when the maximum number of radio link control (RLC) retransmissions is reached. RLC is the link-layer protocol responsible for error recovery and flow control in UTRAN and e-UTRAN. RRC protocol data units are normally transmitted in RLC Acknowledge Mode (AM). If the RLC transmitter can not get an acknowledgement within a predefined period, which corresponds to the maximum number of RLC retransmissions, the corresponding RLC connection may be reset and re-established. These are the cases when RLF is detected in general. These situations are also the reasons for RLF during handover. Moreover, in the case of handover, RLF can be detected when the maximum number of random access attempts in the target cell has been reached.

A RLF recovery procedure is illustrated in FIG. 3a. Two phases 301 and 302 characterize the procedure. The first phase 301 is started upon the start of the radio problem detection 303 for a UE in connected mode 304. The radio problem detection 303 may e.g. be the detection of N out-of-sync indications from the physical layer as described above. A timer T1 defining the first phase 301 is started at the detection of the first out-of-synch indication, and if the radio link quality does not recover before the timer T1 expires, the radio link failure detection will be triggered at t0. This detection ends the first phase 301 and starts the second phase 302. When the timer T2 of the second phase expires, the UE will switch to an idle mode 305, unless it has succeeded to recover to a "best cell" and can remain in a connected mode.

The time for a successful RLF recovery procedure is in the range of several hundreds of milliseconds up to a few seconds. FIG. 3b illustrates schematically the time periods needed in order to successfully recover from a detected RLF, and gives a more detailed view of what happens during T2 in the second phase 302 in FIG. 3a. At t0 the RLF is detected, at t1 the UE is synchronized to the system, at t2 the "best cell" selection is made, at t3 random access is started and at t4 the random access succeeds. Finally, at t5 the RRC connection reestablishment is completed, and if this is achieved before T2 expires, then the RLF recovery procedure is successful. The different time periods of the procedure are explained in the following with typical values within parenthesis:

T21: Synchronize (up to 100 ms)
T22: Perform one measurement (66 ms)
T23: Read the BCCH (0-240 ms)
T24: Perform random access procedure (dependent of RACH)
T25: Perform RRC connection reestablishment (typically a few dozens of ms if cell prepared, in the order of 150 ms otherwise)

In some situations the HO procedure is triggered when radio link quality is degrading, but the UE will still encounter bad radio link conditions. There are numerous reasons for this. One reason may be that the HO Hysteresis Trigger and HO Time-to-Trigger are not set appropriately, and another reason may be that the UE is moving very fast and the link adaptation is thus not working properly. Still another reason is that the UE remains in the same cell, even if the HO triggers are set appropriately. This might happen when the UE has triggered a HO, the serving eNB has decided to HO the UE to a target cell indicated by the UE, but the target cell has not acknowledged the HO request due to lack of available resources.

This scenario is illustrated in FIG. 4. Similarly to what is described above with reference to FIG. 2, a measurement report 401 triggering the HO procedure is transmitted to the source eNB, and the source eNB makes a HO decision 402 and sends a HO request 403 to the target eNB. The reservation of resources is then performed with an admission control (AC) procedure 404 in the target eNB. If the AC indicates that the UE requesting access can not be admitted in the cell, the target eNB sends a non acknowledgement (NACK) of the HO request 405 to the source eNB. As the UE will not receive any HO command in this case, it will stay with the source cell, and continue with the data transmission as usual although the radio channel quality may get worse. After a few hundreds of milliseconds the UE will very likely again transmit a measurement report 406 to the source eNB, still indicating the need for a HO. One option is that, the target cell—which may be another one than in the first case—will have available resources 408 and will acknowledge 409 the HO request 407. If the HO request still returns a NACK due to AC rejection, the UE will have to stay with the source cell for even longer time. The UE in such a scenario may be very close to the source cell edge and will thus very likely have a bad radio link to its source cell. The bad radio conditions will most probably trigger a RLF sooner or later.

FIG. 5 illustrates the probability that a UE will attempt to recover in the serving cell 501, in the target cell 502 or in another third cell 503 in case of a RLF during the HO procedure to a target cell. As already mentioned, a UE will eventually perform the UE-mobility based RLF procedure described above with reference to FIGS. 3a-b. The UE will try to recover in a selected "best cell" in the RLF recovery process. As illustrated in FIG. 5, the probability that a UE will attempt to recover in the target cell is about 70-80%. The probability that the UE will get rejected again during RLF recovery is thus high, as it is not likely that the target cell releases the currently allocated resources and gets enough available resources for the new requests within a few hundred milliseconds. Consequently, this is a problem that results in an increase of the HO delay. Another negative impact is an increase of the HO failure recovery delay, which may result in a lower user satisfaction when it comes to delay-sensitive traffic. Furthermore, if the UE cannot recover within the periods T1+T2 during the RLF procedure (see FIG. 3a) the UE will go to idle mode, which will cause even longer delays due to that a connection reestablishment is needed.

SUMMARY

The object of the present invention is to address some of the problems and disadvantages outlined above, and to allow for a better HO performance by informing the UE when a handover request is rejected by a target radio base station. This enables a better selection of recovery cell in case of a radio link failure. This object and others are achieved by the methods and arrangements according to the independent claims, and by the embodiments according to the dependent claims.

In accordance with a first aspect of the present invention, a method for a user equipment in a wireless communications system of improving a handover of the user equipment is provided. The user equipment is served by a serving radio base station. The method comprises transmitting a message to the serving radio base station, the message indicating the need for a handover to a cell of a target radio base station. The method also comprises observing an indication that a handover request transmitted by the serving radio base station is rejected by the target radio base station, and selecting a recovery cell based on the observed indication when detecting a radio link failure.

In accordance with a second aspect of the present invention, a method for a radio base station in a wireless communications system of improving a handover of the user equipment served by the radio base station is provided. The method comprises receiving a message from the user equipment, the message indicating the need for a handover to a cell of a target radio base station. The method also comprises transmitting a handover request to the target radio base station, based on the message indicating the need for a handover, and receiving a handover request rejection from the target radio base station. Furthermore, the method comprises transmitting information to the user equipment, where the information comprises an indication that the handover request is rejected, in order for the user equipment to select a recovery cell based on said information when it detects a radio link failure.

In accordance with a third aspect of the present invention, a user equipment is provided. The user equipment is configured to be served by a serving radio base station in a wireless communications system, and comprises a transmitter configured to transmit a message to the serving radio base station, the message indicating the need for a handover to a cell of a target radio base station. The user equipment also comprises an observing unit configured to observe an indication that a handover request transmitted by the serving radio base station is rejected by the target radio base station, and a selecting unit configured to select a recovery cell based on the observed indication when the user equipment detects a radio link failure.

In accordance with a fourth aspect of the present invention, a radio base station is provided. The radio base station is configured to be used in a wireless communications system, and to enable a handover of a user equipment served by the radio base station. It comprises a receiver configured to receive a message from the user equipment, the message indicating the need for a handover to a cell of a target radio base station, and a transmitting unit configured to transmit a handover request to the target radio base station, based on the message indicating the need for a handover. The radio base station also comprises a receiving unit configured to receive a handover request rejection from the target radio base station, and a transmitter configured to transmit information to the user equipment. The information comprises an indication that the handover request is rejected, in order for the user equipment to select a recovery cell based on said information when it detects a radio link failure.

An advantage of embodiments of the present invention is that they allow for an improved handover performance in terms of the handover delay.

Still another advantage of embodiments of the present invention is that the handover performance may be improved with a minimum of extra signaling between the RBS and the UE.

A further advantage of embodiments of the present invention is that they improve the system performance and thus increase the user satisfaction through fewer interruptions.

Another advantage of embodiments of the present invention is that they reduce the probability that a RLF recovery exceeds the maximum delay defined in the 3GPP standard and hence fails.

Other objects, advantages and novel features of the invention will become apparent from the following detailed description of the invention when considered in conjunction with the accompanying drawings.

BRIEF DESCRIPTION OF THE DRAWINGS

FIGS. 3a-b illustrate schematically the radio link failure procedure according to prior art.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular embodiments of the invention are described in a non-limiting general context in relation to an e-UTRAN where handover is triggered based on downlink radio channel quality. It should though be noted that the invention and its exemplary embodiments may also be applied to other types of radio access networks such as WiMAX or other systems using hard handover, and to radio networks using other handover triggering criteria.

In embodiments of the present invention, the drawback of selecting a recovery cell during a radio link failure (RLF) procedure which has recently rejected access of a user equipment (UE) due to lack of resources, is addressed by a solution where the UE is informed when a target eNB rejects a handover (HO) request due to non acknowledgement (NACK) in the admission control (AC). An AC NACK means that there are not enough radio resources in the cell of the target eNB to admit the UE to access. By informing the UE about the lack of resources, it is possible to minimize the probability that this designated UE selects the same target cell when recovering from a RLF. In this way the HO performance is improved, as it may reduce HO delay and HO failure.

Figure 1:
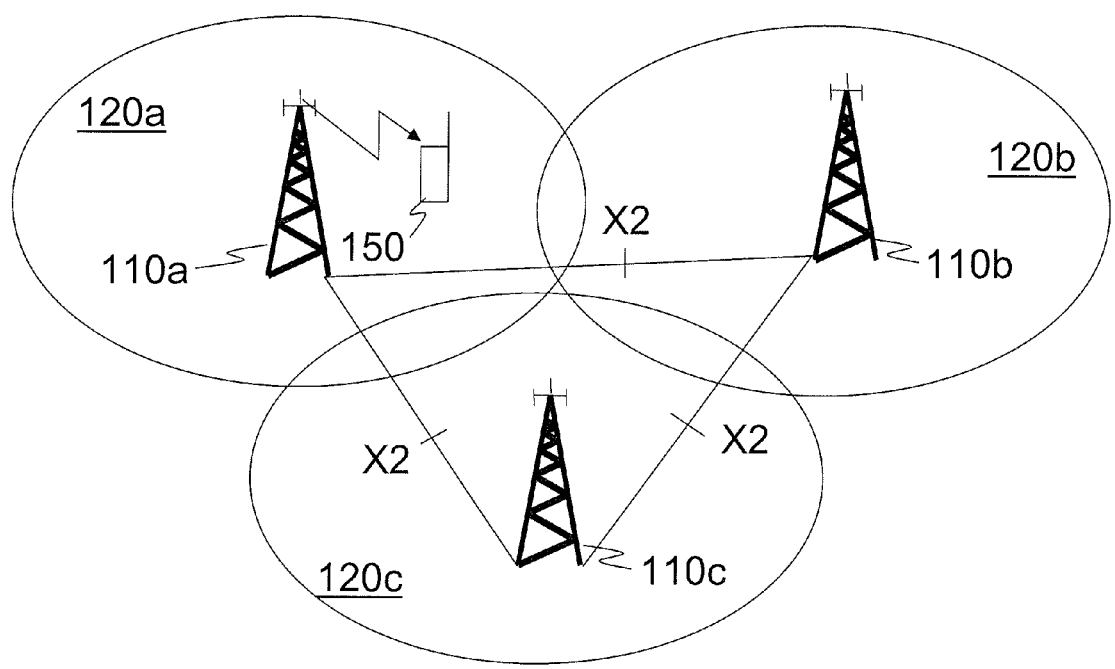
FIG. 1 illustrates schematically a part of a conventional LTE system wherein the present invention may be implemented.
Figure 2:
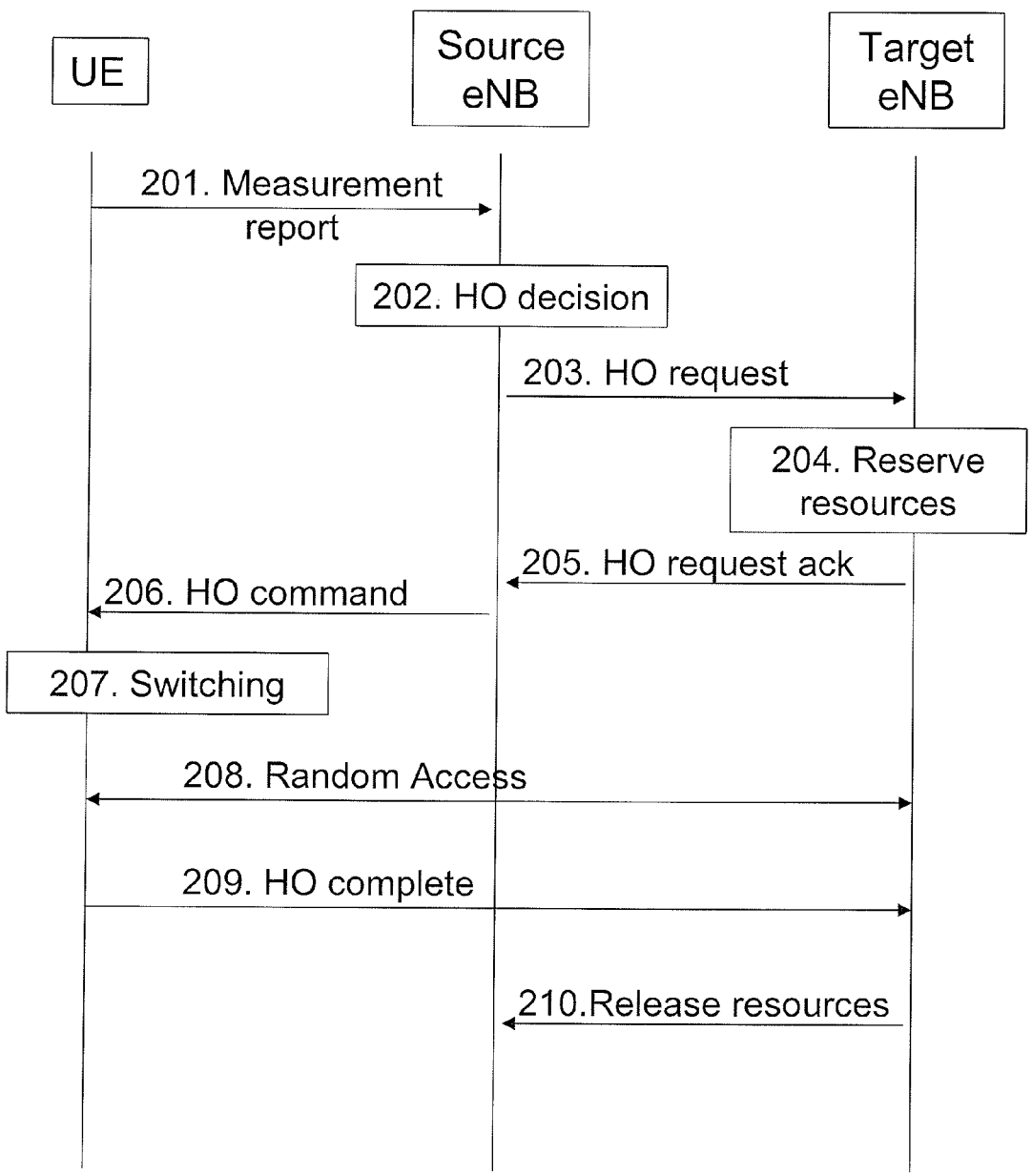
FIG. 2 illustrates the signaling between UE, source eNB and target eNB during a handover procedure according to prior art.
Figure 4:
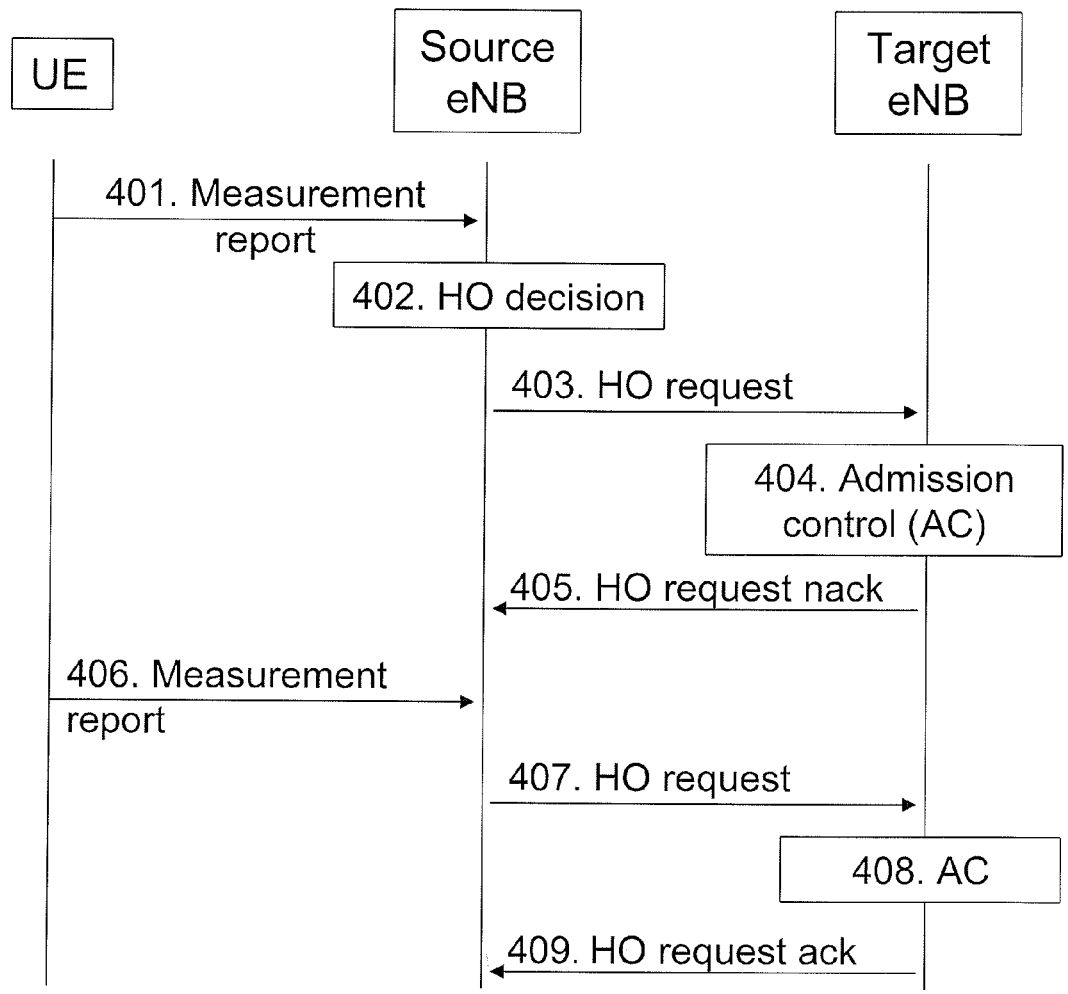
FIG. 4 illustrates the signaling between UE, source eNB and target eNB during a handover procedure according to prior art.
Figure 5:
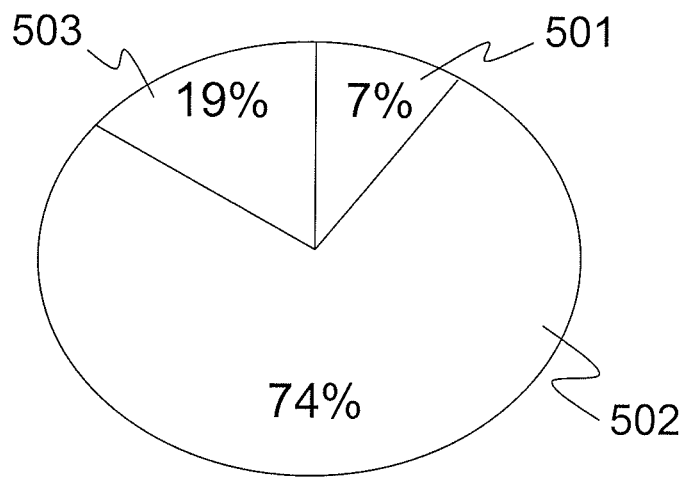
FIG. 5 is a circle diagram illustrating the probability of recovery attempt in the different cells during a RLF procedure.

When a target eNB rejects a HO request due to AC NACK a HO request NACK is transmitted to the source eNB. However, conventionally the HO rejection would not be noticed by the UE that has indicated the need for the HO, as already described above with reference to FIG. 4. This means that it may happen that another measurement report is transmitted to the target eNB, and that a new HO request NACK is received by the source eNB. As already mentioned above, this may eventually lead to a RLF for the UE, as the target eNB resource situation may remain the same for some time. If the previous target cell is also selected as the recovery cell during the RLF recovery procedure, this will add on to the HO delay even more.

In order to avoid these drawbacks, not only the source eNB is informed about the HO rejection, but according to embodiments of the present invention it is also possible for the UE to observe an indication that the HO request has been rejected. There are two different embodiments for how the UE may observe the indication that a HO request has been rejected. These first and the second embodiments may also be combined, as will be further explained below.

According to the first embodiment, the UE receives information from the source eNB comprising an indication that the HO request has been rejected. There are two alternatives of this first embodiment.

Alternative 1:

The UE may receive the information in a radio resource control (RRC) message. It may e.g. be comprised in a new information element of an existing RRC message, such as the RRC reconfiguration message. The RRC reconfiguration message is often used to add, modify or delete the radio access bearer state, also in the case of HO. The "mobilityControlInfo" information element may be used. When the HO request is rejected by the AC in the target eNB and a HO request NACK is transmitted to the source eNB, the source eNB will immediately indicate to the UE via an RRC message that the HO has been rejected due to the AC.

Alternative 2:

The information may be received in an information element of a broadcast control channel (BCCH) message. The UE periodically reads the BCCH of the serving cell, and will thus observe the indication that a HO request has been rejected. A variance of this second alternative is that the UE after transmission of the measurement report indicating the need for a HO to a target cell listens to the BCCH of this target cell as well as to the BCCH of the N strongest neighbor cells. This is further described below.

The eNB may choose which one of the alternatives to use by checking the downlink radio channel quality, for example the Channel Quality Index (CQI) reporting. Based on a comparison of the radio channel quality and a pre-defined quality threshold, where the threshold corresponds to a minimum quality requirement for RRC signaling, the eNB will choose between alternative 1 and 2 for the transmission of the HO rejection indication. If the downlink radio channel quality is good enough, i.e. above the threshold, the serving eNB will transmit the information via dedicated RRC signaling. If it is below the threshold, the serving eNB will choose to transmit the HO rejection indication via BCCH. The reason for checking the radio channel quality before transmitting over RRC is that the probability of a successful decoding of an information element is higher for a BCCH message than for an RRC message in the case of a bad radio channel quality.

Figure 6A:
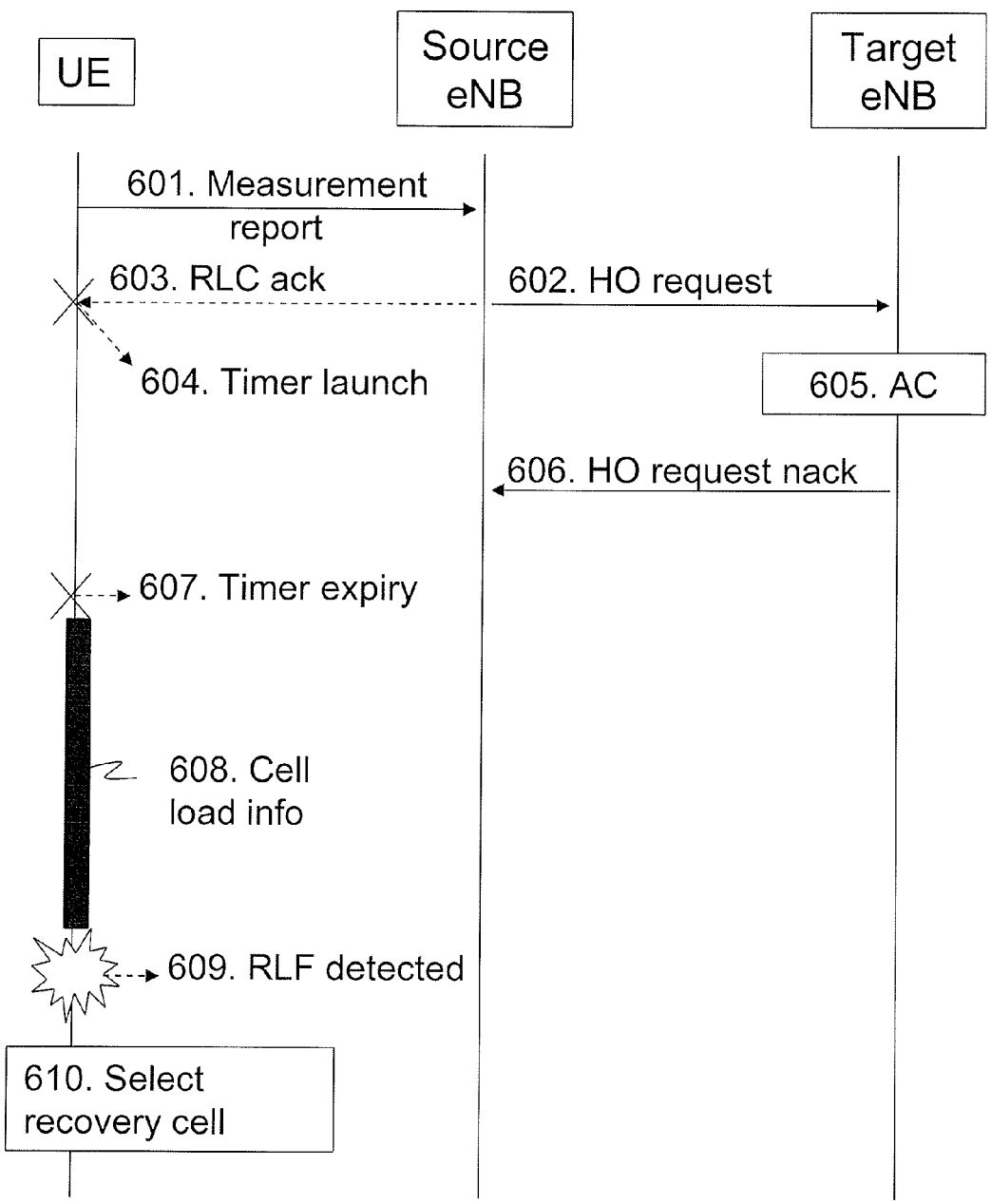
FIG. 6a-b illustrates the signaling flow according to embodiments of the present invention.

According to the second embodiment, the UE makes use of an appositely defined timer in order to assume that the HO request has been rejected. In this case there is thus no need for explicit signaling between the source eNB and the UE. This embodiment is described with reference to FIG. 6a, illustrating the signaling flow between the UE, source eNB and target eNB. A measurement report 601 indicating the need for a HO is transmitted by the UE to the source eNB. The source eNB transmits a HO request 602 to the target eNB. This RRC HO request uses RLC acknowledge mode and will thus generate an RLC acknowledgement 603 which is transmitted to the UE. When the UE receives the RLC acknowledgement, it will launch a timer 604. This timer will be referred to as the HO rejection indication timer. If the AC 605 performed by the target eNB is not successful, a HO request NACK 606 will be received by the source eNB, and there will not be any HO command sent to the UE. In the case of a successful HO request, a HO command would have been received by the UE, and the UE would then have stopped the HO rejection indication timer. However, if the HO rejection indication timer expires 607, the UE may assume that the HO request has been rejected due to non acknowledgement of the AC, and may use this assumption when selecting a recovery cell during a RLF situation.

The HO rejection indication timer value is defined to be equal to the transmission delay of HO signaling messages over the X2 interface between eNBs (i.e. the round trip time for both the HO request 602 and the NACK message 606), plus the processing delay of the AC 605 in the target eNB, plus the minimum transmission delay for a HO command message from the serving eNB to the UE. It is possible to determine a HO rejection indication timer value, as the transmission delay for HO signaling messages may be estimated in both uplink and downlink, and as the round trip time for the X2 signaling may be accurately determined as the X2 connection is a wired connection. In one embodiment of the present invention, the value of the HO rejection indication timer is set by the network and is signaled by the serving eNB to UEs via BCCH. Alternatively, it may be signaled via dedicated RRC signaling upon RRC Connection establishment.

Figure 6B:
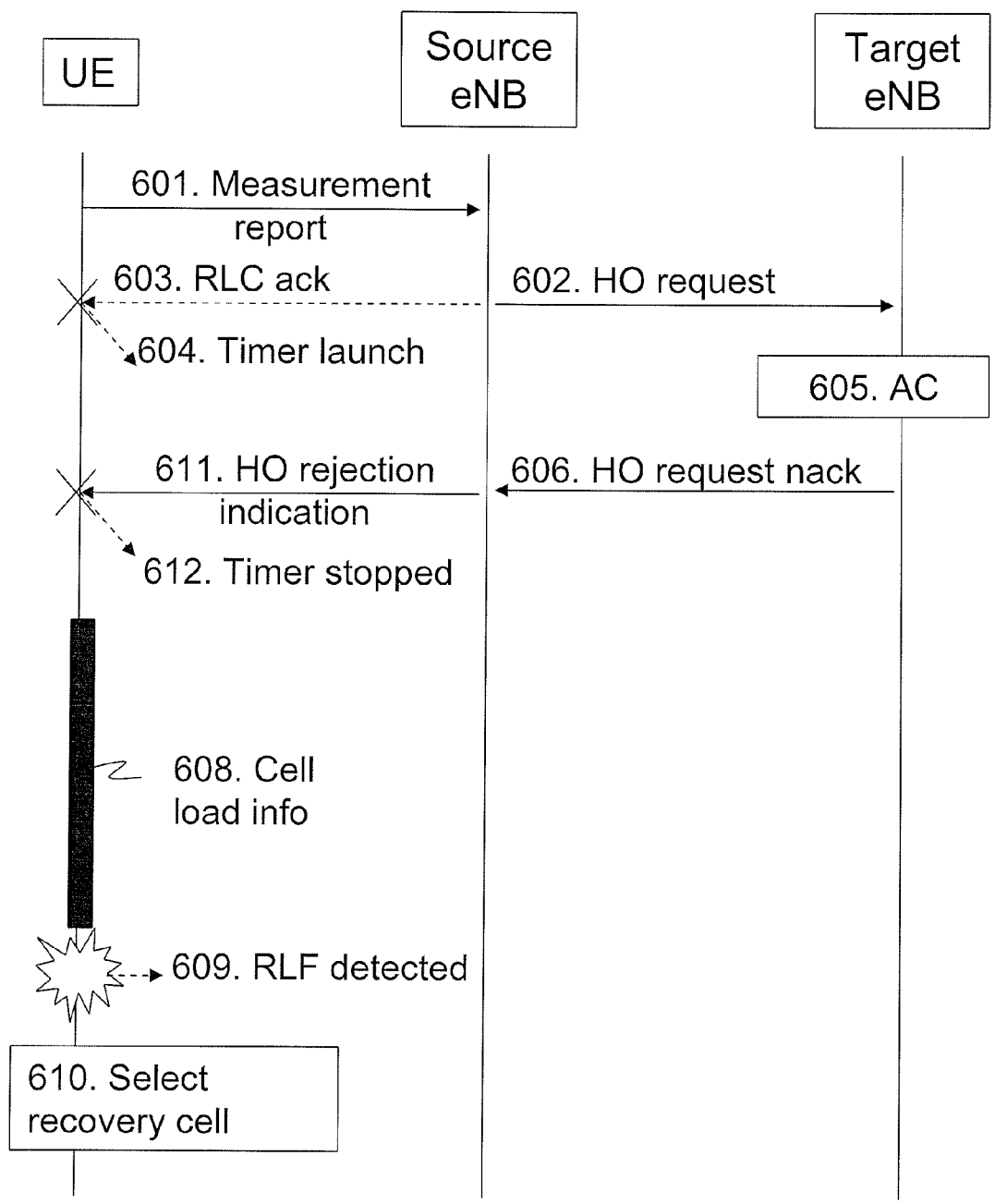

As already mentioned above, the first embodiment may be combined with the second embodiment, and the UE may be informed about a HO rejection either by observing that the HO rejection indication timer has expired or by receiving information in a RRC or BCCH message indicating that a HO request has been rejected. If the HO reject indication is received over RRC or BCCH the HO rejection indication timer will not be used and will thus be stopped. This is illustrated in FIG. 6b, where reference numbers 601 to 606 are the same as in FIG. 6a described above. When the HO request NACK 606 results in a transmission of a HO rejection indication via an RRC message 611, the UE will stop the HO rejection indication timer 612 when it receives the RRC message.

In still another embodiment of the present invention, the information that the UE receives comprising an indication that the HO request has been rejected, may also comprise cell load information. The UE may thus have knowledge of the cell load information of the serving cell and also of the neighboring cells before the RLF recovery procedure is triggered, and this load information may be used by the UE when selecting the "best cell" cell during the RLF recovery. Load information can be useful especially at cases of heavily loaded cells, which are not yet fully loaded. With such information on cell load, UEs are directed to cells which are not heavily loaded and where UEs are not expected to have high probability of AC rejection during RLF recovery.

The serving eNB may retrieve the cell load information for its own cells as well as for the neighboring cells. In the e-UTRAN, the serving eNB may e.g. exchange cell load information with a neighbor eNB via the X2 interface. The cell load can be expressed in various metrics. In e.g. e-UTRAN, cell load can be measured in terms of number of physical resource blocks (PRB) used either in uplink or in downlink. Another possibility is to use total received power in uplink either over the whole system bandwidth or per PRB, or to use the buffer size of the UEs either in uplink or in downlink. Alternatively, the metric used may be the load in the hardware elements used within the eNB. It is preferable that the load information signaled to UEs is related to the metrics used in the AC.

As already mentioned above when describing how to transmit the information comprising the HO rejection indication (alternative 1 and 2), the cell load information may be comprised in a dedicated RRC message or in a broadcasted BCCH message. Dedicated RRC signaling will be used by the eNB when the downlink radio channel quality is better than a pre-defined quality threshold. A new information element including the load information may be added to an existing RRC signaling message, such as the RRC reconfiguration message. When transmitting the cell load information over BCCH in case of poorer radio channel quality then the threshold indicates, all UEs in the cell will listen to the BCCH and will try to decode the load information.

Figure 7:
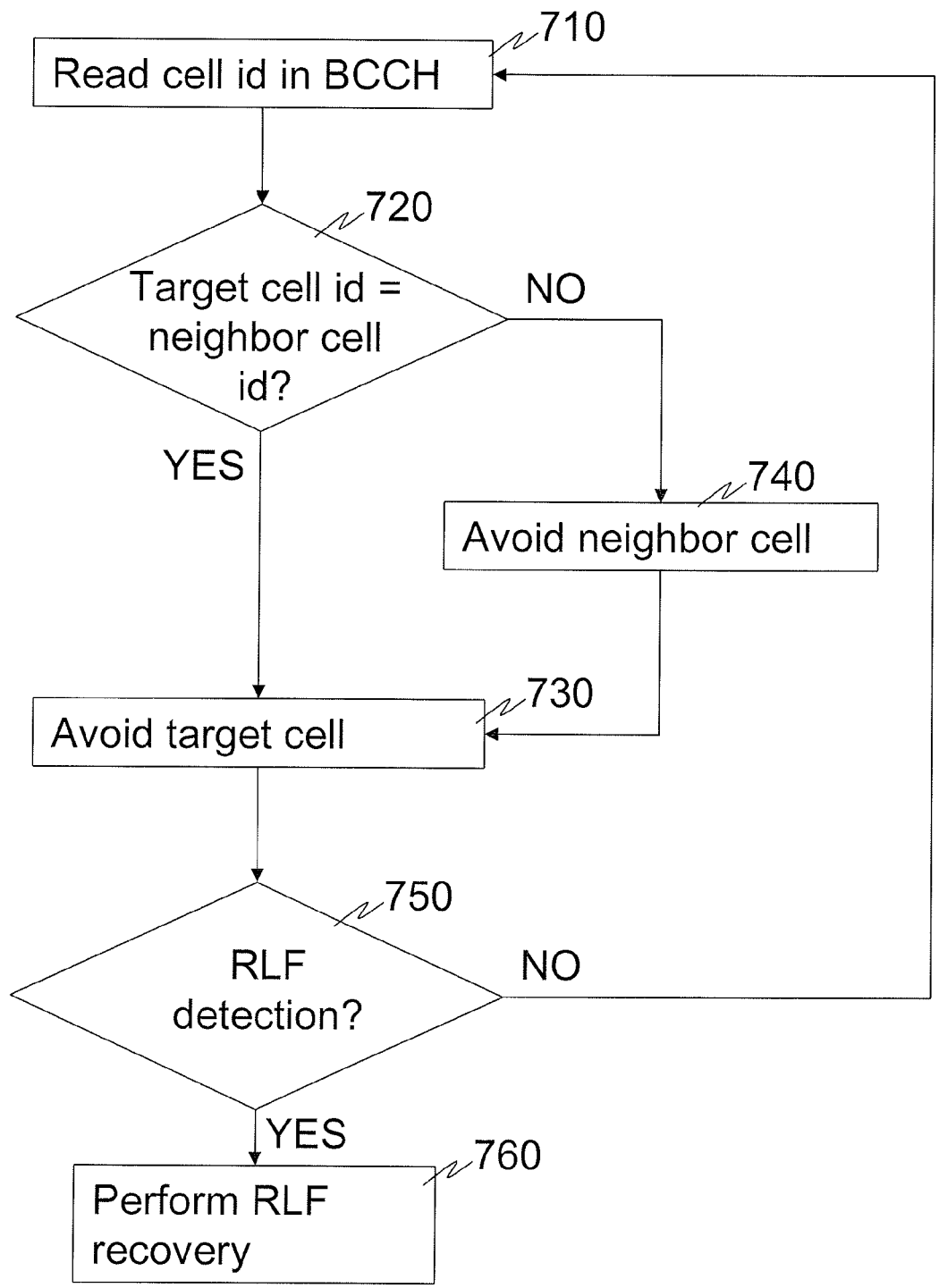
FIG. 7 is a flowchart of a part of the method in the UE according to embodiments of the present invention.

In one embodiment of the present invention, the fact that a HO rejection indication transmitted over BCCH may be read by all UEs in the cell and in neighboring cells is used. A UE that prior of an RLF detection has observed an indication that a HO to a target cell has been rejected, either based on information received from the serving eNB (first embodiment above) or based on the expiry of the HO rejection indication timer (second embodiment above), may listen to the BCCH of the serving cell to check if there are rejected HO requests also for other neighbor cells than the target cell. This implies that the BCCH of a given cell contains information on both its "own" cell and information on the neighbor cells. In case the BCCH of cells contains information only on its "own" cell, then UEs can get information on neighbor cells having rejected UEs during AC by reading the BCCH of these neighbor cells. This embodiment is illustrated by the flowchart in FIG. 7. The UE has transmitted a measurement report indicating that a HO to a certain target cell is needed and has thus triggered the HO procedure. The identity of cells for which a HO has recently been rejected may be read by the UE 710 on the BCCH of the serving cell, as well as on neighboring cells BCCH. The UE may check if a first neighbor cell identity that it receives on the BCCH corresponds to the identity of the target cell 720. If there is a correspondence, this indicates that the target cell should be avoided when selecting a recovery cell when a RLF is triggered 730. However, if a second neighbor cell identity received on the BCCH does not correspond to the target cell identity, then this indicates that this second neighbor cell should also be avoided 740 as recovery cell in case of a RLF, as it has also rejected HO requests recently. Once a RLF is detected 750, then the RLF recovery procedure is performed 760 based on the knowledge that some of the neighbor cells should be avoided when selecting a recovery cell.

According to embodiments of the present invention, the selection of the cell to which recovery is performed when a RLF is detected as a consequence of rejections of a HO request, may be performed based on the following:
- Identities of cell(s) that have rejected HO requests,
- Information about cell load (optionally), and
- Downlink signal quality, e.g. Reference Symbols Received Power (RSRP) in eUTRAN.

The cell which is selected as the "best cell", i.e. the cell where RLF recovery is attempted is the one which maximizes the parameter S, where S is calculated for each cell according to the following equation:

$$S = a(b \cdot L + c \cdot RSRP) \qquad [1]$$

a, b, and c are weight factors which vary between cells. Weight factor a is set depending on whether the cell has rejected any HO requests from eNBs in the preceding M ms. If a HO request has been rejected recently, the value of a should be close to 0. If not, the value of this weight factor should be close to 1. Usually, the time M is determined based on the transmission interval of the HO measurement report messages. Typical values of M are in the range 200 ms to 500 ms. Weight factors b and c may be set by the operator. They define the importance of the cell load L and the RSRP respectively during the selection of the recovery cell. The selected recovery cell may thus be the cell which has not rejected any HO request recently, which has better radio channel quality than the source cell, and which is furthermore lightly loaded.

According to prior art, a UE will typically stay at the source cell if the UE is rejected by the AC in the target cell during the HO preparation period. The UE may try to access the target cell again after a few hundred milliseconds sending a new measurement report message. If a RLF is detected, the UE-mobility based RLF recovery procedure will be performed, as illustrated in FIG. 3b. If the selected "best cell" turns out to be the same as the previous target cell, there is a high probability that the UE gets rejected by the AC again. This procedure will thus probably in vain consume the time period T=T21+T22+T23 (time periods from FIG. 3b), as the UE will not be able to access the selected recovery cell, e.g. due to AC or overload. The BCCH of a cell includes an "access_barred" field set to true, which may indicate among other things that the UE cannot be accessed. In this case, the UE either goes to the second best cell measured during T22, or the UE performs a new measurement. This implies an additional delay comprising of the time periods T22 and T23.

In embodiments of the present invention, such a cell would not be selected as the recovery "best cell", as the UE in beforehand knows about previous HO rejections and in some cases also knows about the cell load. This means that the RLF recovery procedure time is reduced, as the UE does not spend the time corresponding to T22 and T23 (performing measurement of cell and reading BCCH) in the cell which has previously rejected the UE. The main advantage of embodiments of the present invention is thus that the HO delay is reduced, and that the probability of a successful recovery is increased when a RLF is due to AC problems during a HO.

Figure 8A:
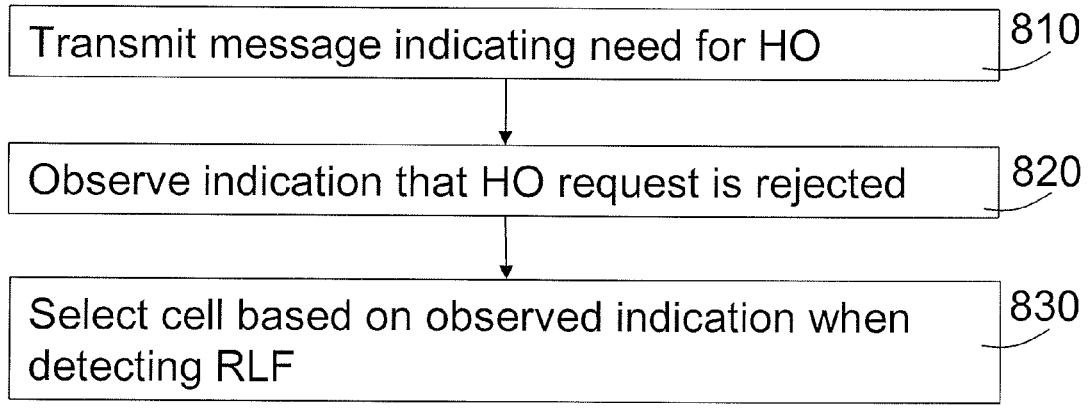
FIGS. 8a-c are flowcharts of the method in the UE according to embodiments of the present invention.

FIG. 8a is a flowchart of the method in the UE according to one embodiment of the present invention. The method comprises the following:

810: Transmit a message to the serving RBS, the message indicating the need for a HO to a cell of a target RBS. The message may e.g. be the measurement report that the UE sends to the eNB to indicate that a HO to a target cell is needed.

820: Observe an indication that a HO request transmitted by the serving RBS is rejected by the target RBS.

830: Select a recovery cell based on the observed indication when detecting a RLF.

Figure 8B:
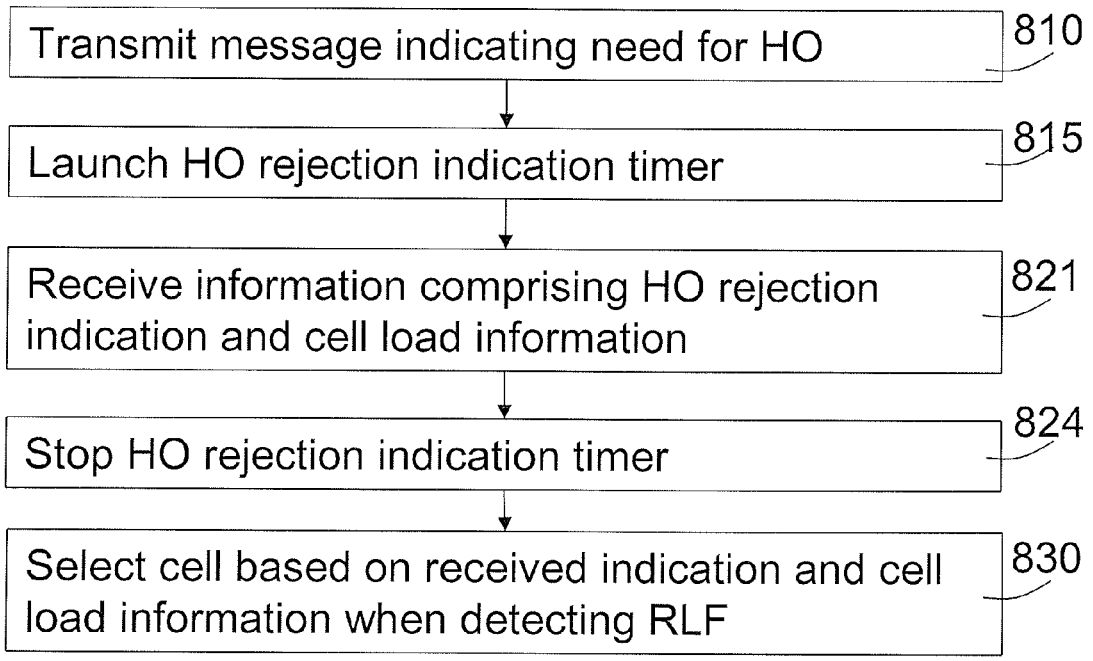

FIG. 8b is a flowchart of the method in the UE according to the combined first and second embodiments of the present invention described above. The method comprises the following:

810: Transmit a message to the serving RBS, the message indicating the need for a HO to a cell of a target RBS.

815: Launch a HO rejection indication timer, where the timer value is determined to be equal to the maximum time between the transmission of a message indicating the need for a HO and the reception of a HO command.

821: Receive information comprising indication that a HO request has been rejected by the target RBS. This is thus a combination of the first and second embodiment described above. The received information may in one embodiment also comprise cell load information for the serving and neighbouring cells. The information may be received either in a dedicated RRC message or may be broadcasted in a BCCH message, depending on if the downlink radio channel quality is above or below a channel quality threshold.

824: Stop the HO rejection indication timer. As information indicating a HO rejection has been received, the timer is no longer needed to observe a HO rejection and is therefore stopped.

830: Select a recovery cell based on the received indication as well as on the cell load information when detecting a RLF.

Figure 8C:
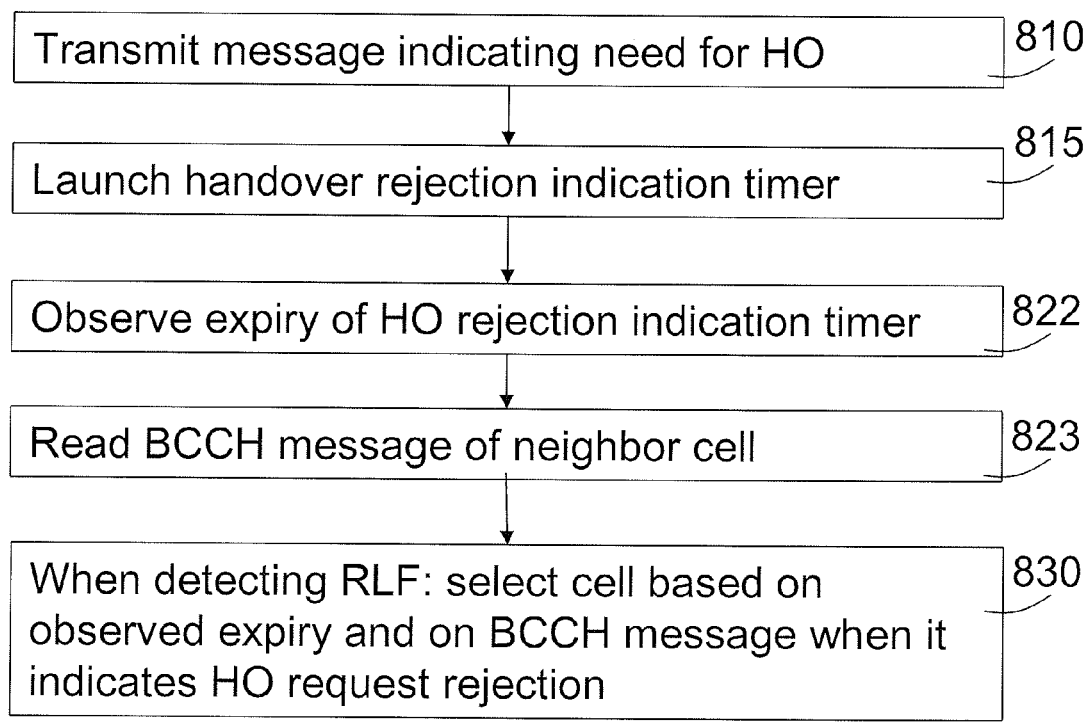

FIG. 8c is a flowchart of the method in the UE according to the second embodiment of the present invention described above. The method comprises the following:

810: Transmit a message to the serving RBS, the message indicating the need for a HO to a cell of a target RBS.

815: Launch a HO rejection indication timer, where the timer value is determined to be equal to the maximum time between the transmission of a message indicating the need for a HO and the reception of a HO command.

822: Observe the expiry of the HO rejection indication timer. When the timer expires, the UE may in one embodiment also read the BCCH in order to retrieve information about the cell load.

823: The UE listens to neighbour cell BCCHs in order to find out if there are other cells that should be avoided during a recovery. The BCCH message from a certain neighbour cell may indicate if the cell has rejected any HO recently. The BCCH message may also comprise information about load in neighbour cells in an alternative embodiment.

830: Select a recovery cell based on the observed expiry when detecting a RLF. The expiry of the timer indicates that the HO request has been rejected by the target RBS, and the UE may thus avoid the target cell when selecting a recovery cell. If a read neighbour cell BCCH has indicated that a neighbouring cell has rejected HOs recently, also this neighbour cell may be avoided when selecting a recovery cell. If load information of neighbouring cells is also comprised in the BCCH message, also the load situation may be taken into account when selecting recovery cell.

Figure 9A:
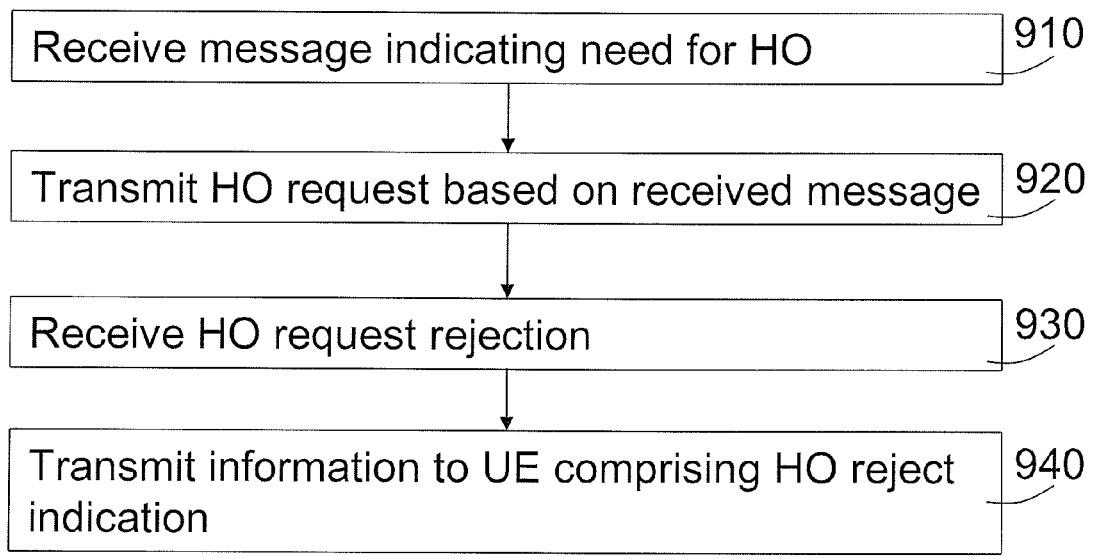
FIGS. 9a-b are flowcharts of the method in the RBS according to embodiments of the present invention.

FIG. 9a is a flowchart of the method in the RBS according to one embodiment of the present invention. The RBS may in one embodiment be an eNB in an e-UTRAN of an LTE system. The method illustrated in the flowchart comprises the following:

- 910: Receive a message from the UE, the message indicating the need for a HO to a cell of a target RBS. The message may e.g. be the measurement report received from the UE indicating that a HO to a target cell is needed.
- 920: Transmit a HO request to the target RBS, based on the message indicating the need for a HO.
- 930: Receive a HO request rejection from the target RBS. The AC in the target RBS is not acknowledged because of lack of resources, and the HO has to be rejected.
- 940: Transmit information to the user equipment that comprises an indication that the HO request is rejected. This makes it possible for the UE to select a recovery cell based on the HO rejection indication when it detects a RLF. The RBS may also transmit cell load information to the UE, in order for the UE to take also the cell load situation into consideration when it selects a recovery cell.

Figure 9B:
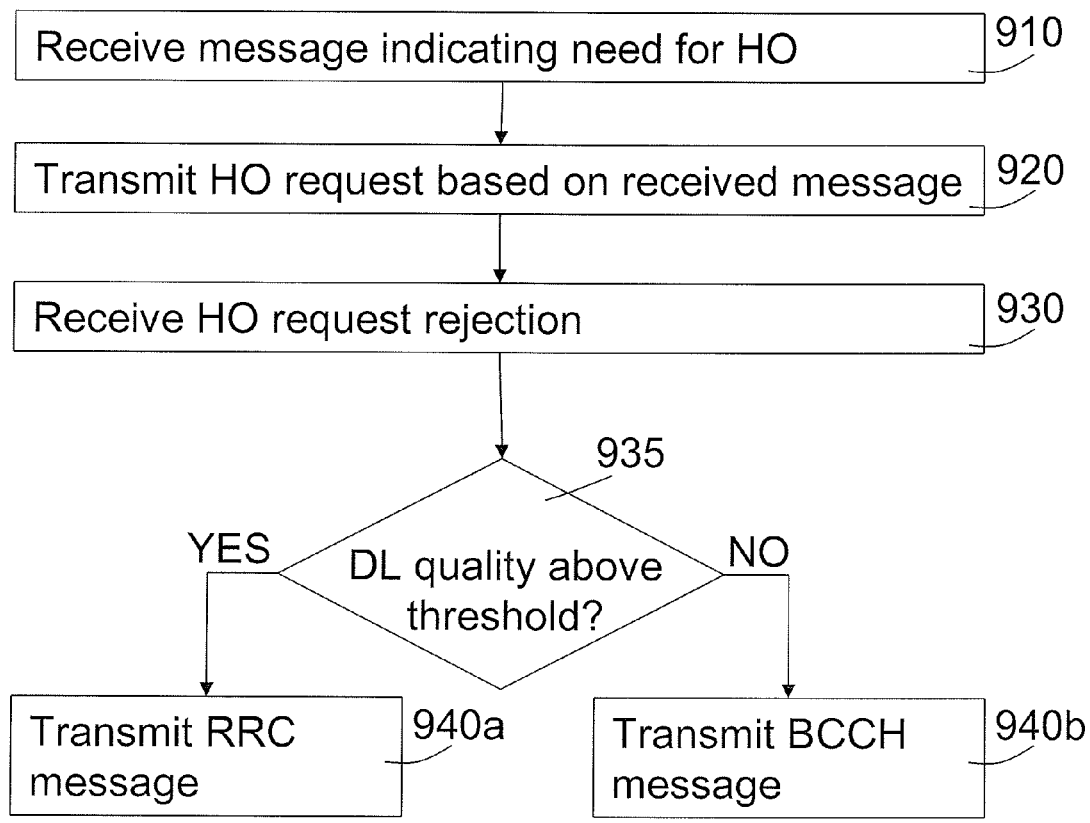

FIG. 9b is a flowchart of the method in the RBS according to another embodiment of the present invention. In this embodiment, the method comprises the following:

- 910: Receive a message from the UE, the message indicating the need for a HO to a cell of a target RBS.
- 920: Transmit a HO request to the target RBS, based on the message indicating the need for a HO.
- 930: Receive a HO request rejection from the target RBS.
- 935: Compare a measurement of the downlink radio quality with a pre-defined quality threshold.
- 940a-b: Transmit information to the user equipment that comprises an indication that the HO request is rejected. The information may also comprise cell load information. The information is transmitted in a dedicated RRC message 940a if the downlink radio quality measure is above the threshold. If the measure is equal to or below the threshold, the information is broadcasted in a BCCH message 940b. The downlink radio quality measure may in one embodiment be the CQI.

Figure 10:
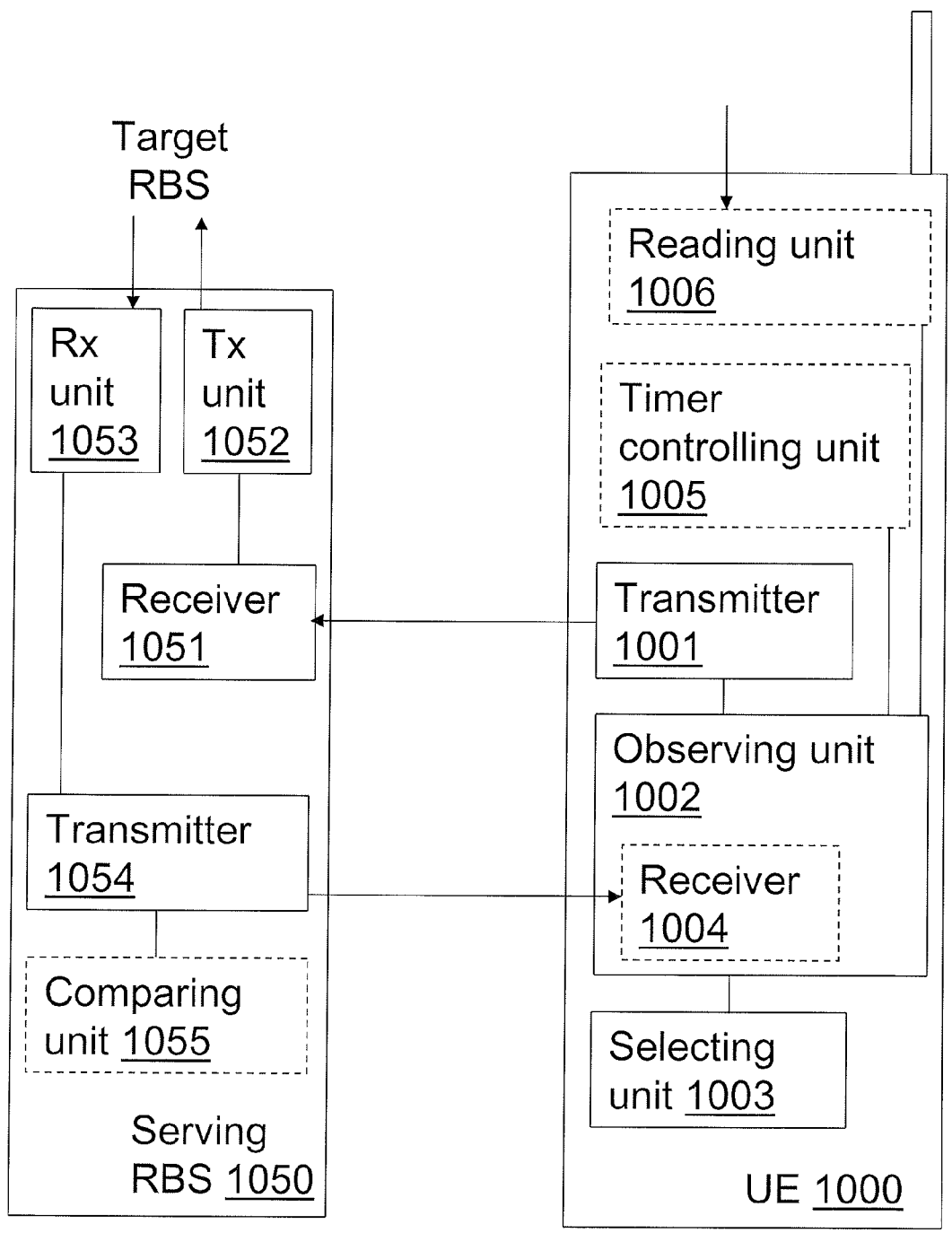
FIG. 10 illustrates schematically the UE and the RBS according to embodiments of the present invention.

The UE 1000 and the RBS 1050 are schematically illustrated in FIG. 10, according to embodiments of the present invention. The RBS 1050 may in one embodiment be an eNB in an e-UTRAN. The UE 1000 comprises a transmitter 1001 configured to transmit a message to the serving RBS. The message indicates the need for a HO to a cell of a target RBS. The UE further comprises an observing unit 1002 configured to observe an indication that a HO request transmitted by the serving RBS is rejected by the target RBS, and a selecting unit 1003 configured to select a recovery cell based on the observed indication when the UE detects a RLF. According to the first embodiment of the present invention described above, the observing unit 1002 comprises a receiver 1004 configured to receive information from the serving RBS, comprising an indication that the HO request is rejected. In one embodiment the receiver 1004 is further configured to receive information also comprising cell load information, and the selecting unit 1003 is further configured to select the recovery cell also based on the received cell load information. The receiver 1004 may be further configured to receive the information in a RRC message or in a BCCH message. According to the second embodiment described above, the UE 1000 further comprises a timer controlling unit 1005 configured to launch a HO rejection indication timer when a RLC acknowledgement associated with the transmission of the message indicating the need for a HO is received from the serving RBS. In this second embodiment, the observing unit 1002 is further configured to observe the expiry of the HO rejection indication timer. In one embodiment, the UE 1000 also comprises a reading unit 1006 which is configured to read neighboring cells BCCH messages, which may indicate if there are other neighbor cells that have rejected HOs recently and should be avoided when selecting recovery cell. The selecting unit 1003 is in this embodiment further configured to select the recovery cell also based on the read BCCH messages of neighboring cells when the messages indicate recently rejected HO in neighboring cells.

The RBS 1050 comprises a receiver 1051 configured to receive a message from the UE indicating the need for a HO to a cell of a target RBS. It also comprises a transmitting unit 1052 configured to transmit a HO request to the target RBS, e.g. over X2, based on the message indicating the need for a HO, and a receiving unit 1053 configured to receive a HO request rejection from the target RBS. Furthermore, the RBS 1050 comprises a transmitter 1054 configured to transmit information to the UE comprising an indication that the HO request is rejected. In one embodiment of the present invention, the RBS 1050 further comprises a comparing unit 1055 configured to compare a downlink radio quality measure with a pre-defined quality threshold. In this embodiment the transmitter 1054 is configured to transmit the information in a RRC message when the downlink radio quality measure is above the pre-defined quality threshold and in a BCCH message when the downlink radio quality measure is equal to or below the pre-defined quality threshold.

The above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

3GPP 3rd Generation Partnership Project
AC Admission Control
ACK Acknowledged
AM Acknowledge Mode
ASIC Application Specific Integrated Circuit
BCCH Broadcast Control Channel
CQI Channel Quality Index
eNB evolved Node B
e-UTRAN evolved UTRAN
GSM Global System for Mobile communications
HO Handover
LTE Long-Term Evolution
NACK Non-acknowledged
NB Node B
RBS Radio Base Station
RLC Radio Link Control
RLF Radio Link Failure
RRC Radio Resource Control
RSRP Reference Symbols Received Power
UE User Equipment
UMTS Universal Mobile Telecommunications System
UTRAN Universal Terrestrial Radio Access Network

The invention claimed is:

1. A method, in a user equipment served by a radio base station in a wireless communications system, of improving a handover of the user equipment, the method comprising:

transmitting a message to the serving radio base station, said message indicating the need for a handover to a cell of a target radio base station;

launching a handover rejection indication timer when a radio link control acknowledgement is received from the serving radio base station, said radio link control acknowledgement being associated with the transmission of the message indicating the need for a handover;

observing an expiry of the handover rejection indication timer as an indication that a handover request is rejected by the target radio base station; and selecting a recovery cell based on the indication that the handover request is rejected by the target radio base station, in response to detecting a radio link failure.

2. The method of claim 1, further comprising reading a broadcast control channel message from at least one neighbor cell, said broadcast control channel message comprising information indicating whether the at least one neighbor cell has rejected any handover request, wherein selecting the recovery cell is also based on said broadcast control channel message.

3. The method of claim 1, further comprising receiving cell load information from the serving radio base station, wherein selecting the recovery cell is also based on said cell load information.

4. The method of claim 1, further comprising reading a broadcast control channel message from at least one neighbor cell, said broadcast control channel message comprising load information for the at least one neighbor cell, wherein selecting the recovery cell is also based on said load information for the at least one neighbor cell.

5. The method of claim 1, further comprising:
receiving an indication from the serving radio base station that a handover request is rejected by the target base station; and
considering the handover rejection indication timer to be expired in response to the received indication.

6. A user equipment configured to be served by a serving radio base station in a wireless communications system, the user equipment comprising:
a transmitter configured to transmit a message to the serving radio base station, the message indicating the need for a handover to a cell of a target radio base station;
a timer controlling circuit configured to launch a handover rejection indication timer when a radio link control acknowledgement is received from the serving radio base station, said radio link control acknowledgement being associated with the transmission of the message indicating the need for a handover;
an observing circuit configured to observe an expiry of the handover rejection indication timer as an indication that a handover request is rejected by the target radio base station; and
a selecting circuit configured to select a recovery cell, based on the indication that the handover request is rejected by the target radio base station, in response to a detecting of a radio link failure.

7. The user equipment of claim 6, further comprising a receiver configured to read a broadcast control channel message from at least one neighbor cell, said broadcast control channel message comprising information indicating whether the at least one neighbor cell has rejected any handover request, wherein the selecting circuit is configured to select the recovery cell based also on said broadcast control channel message.

8. The user equipment of claim 6, further comprising a receiver configured to receive cell load information from the serving radio base station, wherein the selecting circuit is configured to select the recovery cell based also on said cell load information.

9. The user equipment of claim 6, further comprising a receiver configured to receive a broadcast control channel message from at least one neighbor cell, said broadcast control channel message comprising load information for the at least one neighbor cell, wherein the selecting circuit is configured to select the recovery cell based also on said load information for the at least one neighbor cell.

10. The user equipment of claim 6, further comprising a receiver configured to receive an indication from the serving radio base station that a handover request is rejected by the target base station, wherein the observing circuit is further configured to consider the handover rejection indication timer to be expired in response to the received indication.

11. A method, in a radio base station in a wireless communications system, of improving a handover of a user equipment served by the radio base station, the method comprising:
receiving a message from the user equipment, said message indicating the need for a handover to a cell of a target radio base station;
transmitting a handover request to the target radio base station, based on the message;
receiving a handover request feedback from the target radio base station;
comparing a downlink radio quality measure with a pre-defined quality threshold; and
selectively using a radio resource control message or a broadcast control channel message for transmitting information that includes an indication that the handover request is rejected by the target base station to the user equipment, such that the transmitted information is transmitted in a radio resource control message in the event that the downlink radio quality measure is above the pre-defined quality threshold and the transmitted information is transmitted in a broadcast control channel message in the event that the downlink radio quality measure is equal to or below the pre-defined quality threshold.

12. The method of claim 11, wherein said transmitted information further comprises cell load information for the serving and neighboring cells.

13. A radio base station configured to be used in a wireless communications system and to enable a handover of a user equipment served by the radio base station, the radio base station comprising:
a receiver configured to receive a message from the user equipment, the message indicating the need for a handover to a cell of a target radio base station;
a transmitting unit configured to transmit a handover request to the target radio base station, based on the message;
a comparing circuit configured to compare a downlink radio quality measure with a pre-defined quality threshold; and
a transmitter configured to, in response to the receiver's receipt of a handover request rejection from the target radio base station, selectively use a radio resource control message or a broadcast control channel message for transmitting information that includes an indication that the handover request is rejected by the target base station to the user equipment, such that the transmitted information is transmitted in a radio resource control message in the event that the downlink radio quality measure is above the pre-defined quality threshold and the transmitted information is transmitted in a broadcast control channel message in the event that the downlink radio quality measure is equal to or below the pre-defined quality threshold.

14. The base station of claim 13, wherein said transmitter is further configured to transmit cell load information for the serving and neighboring cells.

15. A method, in a user equipment served by a radio base station in a wireless communications system, of improving a handover of the user equipment, the method comprising:
- transmitting a message to the serving radio base station, said message indicating the need for a handover to a cell of a target radio base station;
- receiving information from the serving radio base station, said information comprising an indication that the handover request is rejected and further comprising cell load information;
- selecting a recovery cell based on the indication that the handover request is rejected and based further on the received cell load information, in response to detecting a radio link failure.

16. The method of claim 15, wherein said information is received in a radio resource control message.

17. The method of claim 15, wherein said information is received in a broadcast control channel message.

18. A user equipment configured to be served by a serving radio base station in a wireless communications system, the user equipment comprising:
- a transmitter configured to transmit a message to the serving radio base station, the message indicating the need for a handover to a cell of a target radio base station;
- a receiver circuit configured to receive information from the serving radio base station, said information comprising an indication that the handover request is rejected and further comprising cell load information; and
- a selecting circuit configured to select a recovery cell, based on the indication that the handover request is rejected and based further on the received cell load information, in response to detecting a radio link failure, in response to a detecting of a radio link failure.

* * * * *